United States Patent
Wang

(10) Patent No.: US 9,917,611 B2
(45) Date of Patent: Mar. 13, 2018

(54) MOLDED PULP CASE FOR MOBILE DEVICE

(71) Applicant: Yifan Wang, Saint Joseph, MI (US)

(72) Inventor: Yifan Wang, Saint Joseph, MI (US)

( * ) Notice: Subject to any disclaimer, the term of this patent is extended or adjusted under 35 U.S.C. 154(b) by 0 days.

(21) Appl. No.: 14/971,494

(22) Filed: Dec. 16, 2015

(65) Prior Publication Data

US 2017/0179990 A1    Jun. 22, 2017

(51) Int. Cl.
*H04B 1/3888* (2015.01)

(52) U.S. Cl.
CPC .................. *H04B 1/3888* (2013.01)

(58) Field of Classification Search
CPC ..................................... H04B 1/3888
USPC ...................................... 455/575.8
See application file for complete search history.

(56) References Cited

U.S. PATENT DOCUMENTS

| | | | | |
|---|---|---|---|---|
| 5,785,817 | A * | 7/1998 | Tan | C08J 9/32 162/218 |
| 8,663,425 | B2 | 3/2014 | Noishiki et al. | |
| 8,675,862 | B1 * | 3/2014 | Lin | H04M 1/185 379/437 |
| 8,706,176 | B1 * | 4/2014 | Jia | H04M 1/04 206/305 |
| 8,887,909 | B2 * | 11/2014 | McCarthy | A45C 11/00 206/320 |
| 2009/0080153 | A1 * | 3/2009 | Richardson | H04M 1/18 361/679.56 |
| 2013/0062342 | A1 * | 3/2013 | Hansen | B65D 43/169 220/4.22 |
| 2013/0079067 | A1 * | 3/2013 | Peng | H04M 1/0283 455/575.1 |
| 2014/0055014 | A1 * | 2/2014 | Pan | H05K 5/02 312/223.2 |
| 2014/0100005 | A1 * | 4/2014 | Bae | B29C 45/1418 455/575.8 |
| 2014/0262849 | A1 * | 9/2014 | Karp | H04M 1/185 206/37 |
| 2015/0024811 | A1 * | 1/2015 | Yoon | D03D 1/0088 455/575.8 |
| 2016/0006474 | A1 * | 1/2016 | Zhang | H04B 1/3888 455/575.8 |
| 2016/0072933 | A1 * | 3/2016 | Cox, III | H04M 1/185 455/575.8 |

(Continued)

OTHER PUBLICATIONS

Cardboard Phone Case http://www.amazon.com/dp/B00C0LZT76/ref=cm_sw_su_dp; printed on Oct. 15, 2014.

(Continued)

*Primary Examiner* — Simon Nguyen
(74) *Attorney, Agent, or Firm* — Notre Dame Intellectual Property Clinic

(57) ABSTRACT

A removable case for a mobile device formed from a molded pulp that is capable of conforming to the shape of the mobile device. The elasticity of the molded pulp material allows it to conform to the shape of the mobile device and to retain the mobile device within the case. This elasticity also aids in the protection of the mobile device. The molded pulp case has a plurality of sides that cover at least a portion of the side walls of the mobile device and overlap a portion of the front panel of the mobile device. A back panel covers a substantial portion of the rear panel of the mobile device.

20 Claims, 5 Drawing Sheets

(56) References Cited

U.S. PATENT DOCUMENTS

2016/0191095 A1* 6/2016 Santelli ............... H04B 1/3888
                                                        455/575.8

OTHER PUBLICATIONS

Jelly Belly Phone Case http://www.amazon.com/dp/B00BEHEJ1E/ref=cm_sw_su_dp; printed on Oct. 15, 2014.
Wood Phone Case http://www.carved.com/; printed on Apr. 22, 2015.
Engraved Wood Phone Case http://notascratch.com/; printed on Apr. 22, 2015.
Promotional Phone Case http://www.4imprint.com/tag/4687/Phone?gclid=CjwKEAjwjd2pBRDB4o_ymcieoAQSJABm-4egouCuwSpjPNw7m-37dWKWIJnJJTMRhFqEW27SGK0C3uRoCrYHw_wcB &mkid=1tny_40_010 &s_kwcid=AL!4167!3!62397260042!e!!g!!promotional%20phone%20case&ef_id=U9ywMQAABSVC9mEp:20150423010410:s; printed on Apr. 22, 2015.

\* cited by examiner

MOLDED PULP CASE FOR MOBILE DEVICE

CROSS-REFERENCE TO RELATED APPLICATIONS

This application claims the benefit of U.S. Provisional Application Ser. No. 62/093,091 filed on Dec. 17, 2014, which is incorporated herein by reference in its entirety.

TECHNICAL FIELD

The described apparatus and methods relate to the field of cases for mobile devices.

BACKGROUND

In the past few decades, mobile devices have become ubiquitous. Many people will not leave home without one, and such devices are constantly visible in society. Ever-present mobile devices and the manner in which they are decorated and carried have become a way to express individuality, similar to clothing and fashion accessories. However, unlike clothing, cases for mobile devices are typically unchanged for months or years at a time due to their cost. Because of the expense of a case, people continue to use damaged mobile device cases rather than replace them, reducing the protection offered to their mobile device by their case. In addition, mobile devices themselves become obsolete quickly and must be replaced typically at a high cost. Rarely, do old mobile device cases fit the new mobile device, necessitating replacement of the mobile device case when the mobile device is replaced. The typical consumer does not have the resources to swap his or her mobile device case regularly or is unwilling to do so. The result may be less protection for their mobile device, such as when a damaged case is used. Or, the expense may limit the ability of the user to fully express his or her fashion or taste through their mobile device case.

Even if an individual were to purchase a variety of expensive cases for a mobile device, disposing of such cases after the individual is done with them poses a problem for environmentally sensitive users. Cases are typically made of materials that are difficult to recycle. In addition, current cases typically require extensive, multi-step processes for manufacture, which increases costs and energy use. Consequently, purchasing a variety of cases for a mobile device is also a less than "green" option.

BRIEF SUMMARY

The following presents a simplified summary in order to provide a basic understanding of some aspects of the claimed subject matter. This summary is not an extensive overview. It is not intended to either identify key or critical elements or to delineate the scope of the claimed subject matter. Its sole purpose is to present some concepts in a simplified form as a prelude to the more detailed description that is presented later.

A removable case for a mobile device comprising a plurality of sides that cover at least portion of side walls of the mobile device and a back panel. When the mobile device is seated in the removable case, the plurality of sides overlap at least a portion of a front panel of the mobile device and the back panel substantially covers a rear panel of the mobile device when the mobile device is seated in the removable case. The case is formed from a molded pulp conforming to the shape of the mobile device.

A process for producing a removable case for a mobile device, comprising combining a raw material with water in a pulper; blending the raw material and water into a preliminary pulp in the pulper; drawing the preliminary pulp onto a formation mold substantially shaped as the mobile device to generate a shaped pulp; and drying the shaped pulp to produce a molded pulp. In embodiments, the molded pulp comprises a plurality of side walls and a back panel. When the mobile device is seated in the case, the side walls cover at least a portion of the front panel of a mobile device, and the back panel covers at least a portion of the back of the mobile device.

To the accomplishment of the foregoing and related ends, certain illustrative aspects of the claimed subject matter are described herein in connection with the following description and the annexed drawings. These aspects are indicative of various ways in which the subject matter may be practiced, all of which are intended to be within the scope of the claimed subject matter. Other advantages and novel features may become apparent from the following detailed description when considered in conjunction with the drawings.

BRIEF DESCRIPTION OF THE DRAWINGS

The systems, devices and methods can be better understood by referring to the following description in conjunction with the accompanying drawings, in which like numerals indicate like structural elements and features in various figures. The components in the figures are not necessarily to scale, and simply illustrate the principles of the systems, devices and methods. The accompanying drawings illustrate only possible embodiments of the systems, devices and methods and are therefore not to be considered limiting in scope.

DETAILED DESCRIPTION

Aspects of the system and methods are described below with reference to illustrative embodiments. The references to illustrative embodiments below are not made to limit the scope of the claimed subject matter. Instead, illustrative embodiments are used to aid in the description of various aspects of the systems and methods. The description, made by way of example and reference to illustrative reference is not meant to being limiting as regards any aspect of the claimed subject matter.

The present disclosure describes a removable case for a mobile device. A typical mobile device is generally rectangular in shape, with rounded corners, and includes a front face that frequently incorporates a touch sensitive display and one or more buttons; four side walls that can include apertures for one or more buttons, a speaker, microphone, as well as apertures for head phone and power connections; and a back panel that protects the interior components of the mobile device.

Figure 1A:
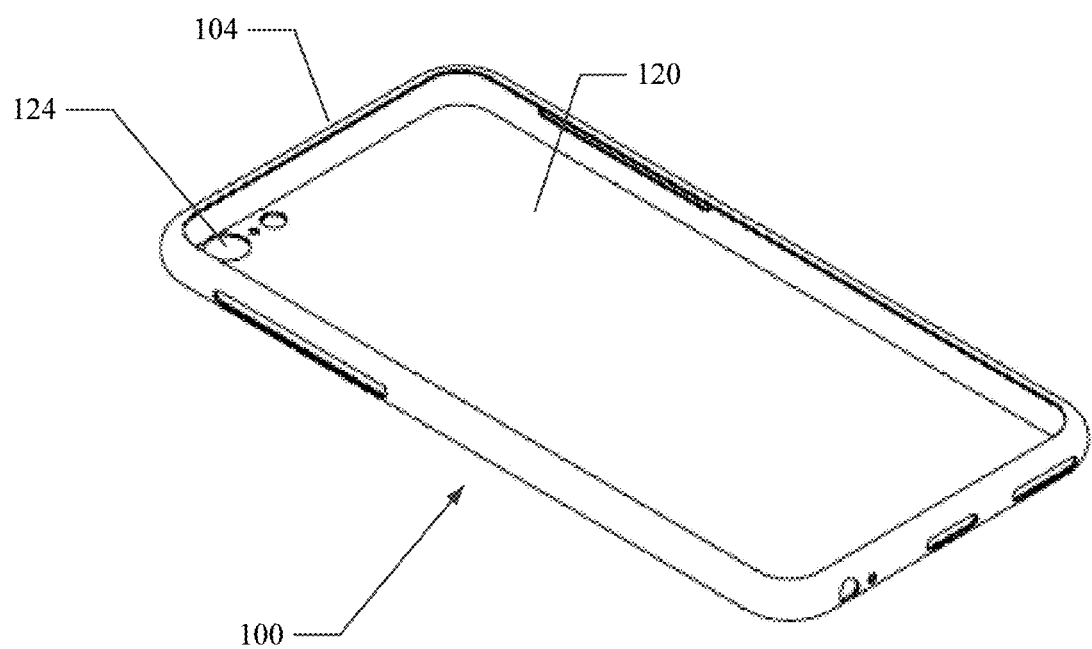
FIG. 1A depicts a perspective view of an embodiment of the molded pulp case.
Figure 1B:
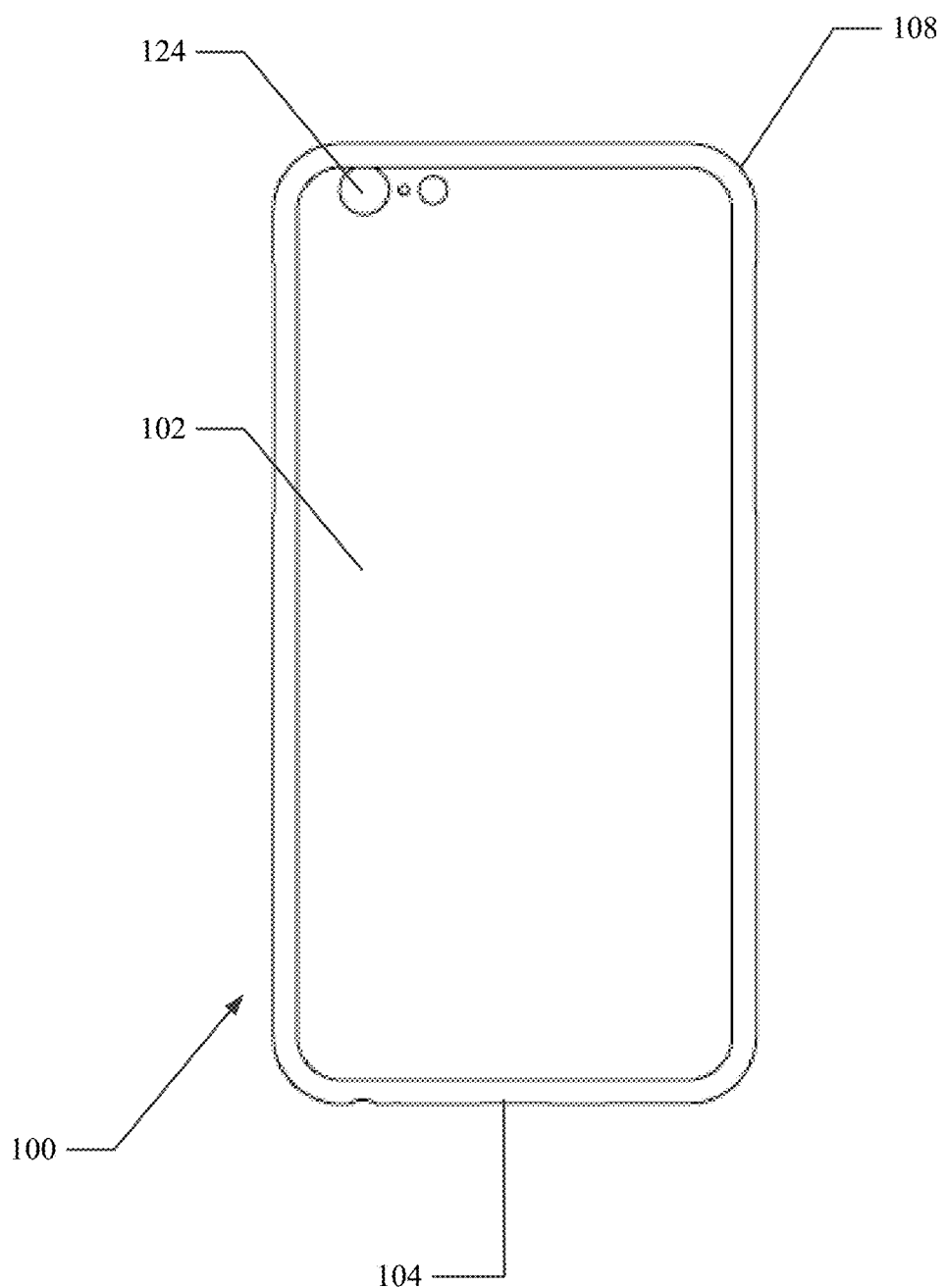
FIG. 1B depicts a front view of an embodiment of the molded pulp case.
Figure 1D:
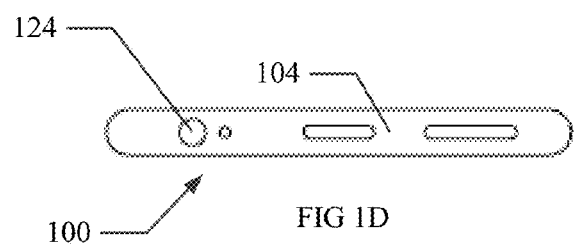
FIG. 1D depicts a top view of an embodiment of the molded pulp case.
Figure 1C:
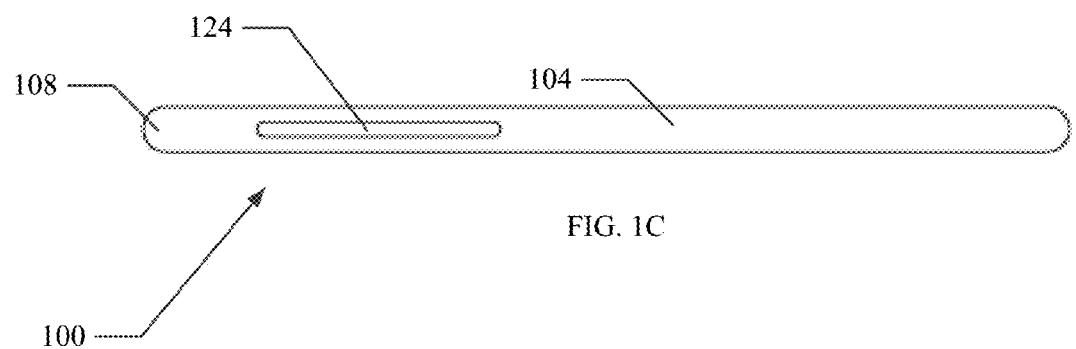
FIG. 1C depicts a side view of an embodiment of the molded pulp case.

FIG. 1A depicts an embodiment of a molded pulp case 100. Users typically carry their mobile devices with them, thrown in handbags, purses, backpacks, briefcases, or pockets. Users purchase typical cases to help protect the expensive electronics within their mobile devices. The molded pulp case 100 can protect the back and sides of the device, preventing marks, scratches and other damage. In embodiments, the elastic nature of the case 100 also provides shock absorbance, reducing potential impacts on the mobile device and reducing potential damage to the mobile device. In addition, a relatively inexpensive molded pulp case 100 can be easily replaced when damaged, affording greater protection to the mobile device.

In embodiments, the case 100 comprises a plurality of sides 104 and a back panel 120. The plurality of sides 104 cover at least portion of side walls of the mobile device and overlap at least a portion of the front panel of the mobile device. The back panel 102 substantially covers a rear panel of the mobile device. The case 100 is formed from a molded pulp conforming to the shape of the mobile device.

Embodiments of the molded pulp case (also referred to as a "case") 100, as disclosed herein, are formed from a molded pulp and generally conform to the shape of a mobile device. The molded pulp case 100 has many advantages. In embodiments, the molded pulp case 100 is easy and inexpensive to manufacture. This means the molded pulp case 100 can be used as a promotional or giveaway item. The relative inexpensiveness of the molded pulp case 100 also can allow users to change their cases based upon their fashion or whim, or if the cases are broken, damaged or defaced. Another advantage is that in embodiments the pulp from which the case is formed can be made from recycled material, which can be recycled again once the case 100 is no longer being used. This makes the molded pulp case 100 environmentally friendly.

Another advantage of embodiments of the molded pulp case 100 is the elastic nature of the pulped material. The elasticity of the case 100 allows it to deform to insert the mobile device into the case 100 and then reform around the device. This enables the case 100 to be monolithic, or formed as a single piece without requiring folding or cutting of the pulped material. The elasticity of the case 100 also allows the case to absorb shock better than a case made from rigid, inelastic material.

The molded pulp case 100 can include multiple beneficial features. For example, in embodiments the surface of the case 100 is rough or textured, which makes the case 100 easy to grip. In other embodiments of the molded pulp case 100 a colorant, an odorant, or glitter particles can be easily added to the pulp before it is molded to form the case 100, as will be described in detail below. It is not necessary that all the advantageous features be incorporated into every embodiment, and not all the advantages of the described cases are listed.

Turning now to the figures, FIGS. 1A-1D depict embodiments of the molded pulp case 100. As illustrated, the molded pulp case 100 includes a back panel 102 and multiple sides 104. As shown, the case 100 can include four sides 104, substantially covering the sidewalls of a mobile device when in place. When in use, the mobile device is seated in the case 100. The back panel of the mobile device is protected by the back panel 102 of the case 100. Four sides 104 cover the side walls of the mobile device and can overlap at least a portion of the front panel of the mobile device. In other embodiments, the case 100 can include fewer than four sides, covering at least portion of side walls of the mobile device. For example, in an embodiment, the case 100 includes two sides that cover a portion of two, opposite sidewalls of the mobile device, allowing the device to be slide into the case. The molded pulp case 100 is frictionally engaged with the mobile device, thus retaining the mobile device within the molded pulp case 100.

In embodiments, a plurality of sides 104 of the case 100 overlap a portion of the front panel of the mobile device. This overlap assist in retaining the device within the interior of the case 100 while exposing the majority of the front panel of the mobile device. Typically, the front panel includes a user interface, such as a touch sensitive surface. In embodiments, the overlap is relatively small such that the case 100 does not obstruct the front panel and user interface, or obstructs only a small portion of the front panel.

In embodiments, an interior surface 120 of the case 100 has a generally smooth texture so that the mobile device will fit generally flush against the case 100. In embodiments, the interior surface 120 texture is sufficiently rough or uneven to prevent vacuum suction from forming between the case 100 and the device. This allows for easy removal of the device from the case 100, enabling the case 100 to be swapped out or replaced. Typically, the user grips the case 100 by the exterior surface 122. In embodiments, the exterior surface 122 is generally rough or uneven, such that there is a high coefficient of friction between the exterior surface 122 and the individual's hand, reducing the likelihood of an accidental drop of the case 100. In embodiments, the exterior surface of the case 100 is textured.

The elastic nature of the material from which the case 100 is made allows the case 100 to deform or stretch to insert the mobile device in the case 100 and then reform securely around the device. In embodiments, the case 100 is reusable and the elastic nature of the case 100 allows a mobile device to be inserted, removed, and reinserted into the case 100 for repeated uses. The reusable nature of the case 100, as well as the relatively low cost, permits users to keep a virtual wardrobe of cases 100 in a variety of styles and patterns, swapping between cases 100 for various events, or simply to match a mood or an outfit.

Figure 2:
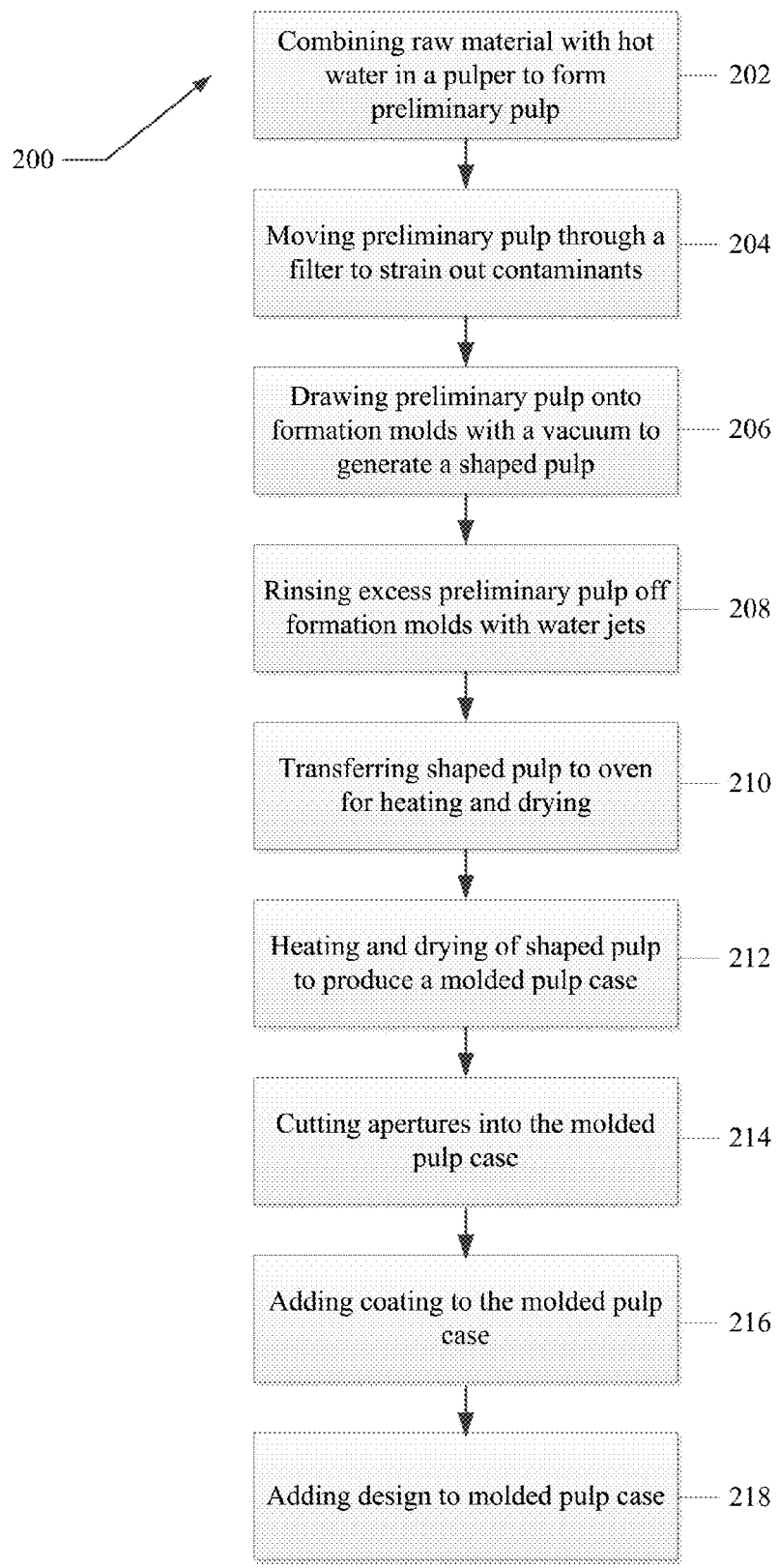
FIG. 2 depicts a flowchart of an embodiment of the pulp molding process.

Turning now to FIG. 2, the molded pulp case 100 can be manufactured through a pulp molding process 200. At step 202, raw material to be made into a preliminary pulp is combined with hot water in a pulper. A pulper is a machine that blends the raw material with the hot water until the fibers of the raw material break apart and become a preliminary pulp. In one embodiment, the hot water is about 43 to about 65 degrees Celsius and mixed with the raw material for about 20 minutes to form the preliminary pulp. During the blending step, one or more chemicals, such as bleach, can be added to the preliminary pulp to break down, bleach, and/or remove ink and other contaminates from the raw material. In embodiments the preliminary pulp is then moved through a filter to strain out contaminates, at step 204. For example, filtering can remove large particles of the raw material that have failed to break down during the blending step. Then the preliminary pulp is drawn onto a formation mold to generate a shaped pulp. In one embodiment, as at step 206, a vacuum draws the preliminary pulp onto formation molds. Multiple formation molds, each shaped and sized to specific models of mobile devices, can be used. The formation molds can be made from materials including, but not limited to, bronze, plastic, or aluminum and can be covered with a mesh, which can be formed from stainless steel. A vacuum is applied to a side of the formation mold, creating a generally even vacuum draw on the formation mold, drawing the preliminary pulp against the mesh, and resulting in a generally even preliminary pulp layer on the formation mold. The smoothness of the interior surface of the molded pulp case 100 is determined, at least in part, by the smoothness of the surface formation mold. At step 208, excess of the preliminary pulp is rinsed off the formation molds with one or more liquid jets. A shaped pulp is formed by the shaping of the preliminary pulp on the formation mold. The shaped pulp is then dried to produce a molded pulp. In one embodiment, the shaped pulp is transferred from the formation molds to an oven for heating and drying, at step 210, to produce the molded pulp case 100.

In embodiments, the transfer to the oven at step 210 can be done using transfer molds to grab the shaped pulp off the formation molds and move it onto a conveyer that takes it to the oven. The transfer molds can be made from materials including, but not limited to, bronze, plastic, or aluminum, and the transfer molds can be coated with a water-based lubricant to keep the shaped pulp from sticking to the transfer molds during the transfer to the oven. In embodiments, the shaped pulp is baked in the oven, at step 212. In embodiments, the shaped pulp can be baked for about 6 to about 30 minutes at about 176 to about 205 degrees Celsius to evaporate the water or other liquids and bond the fibers in the shaped pulp together to form a molded pulp, a substantially rigid, but flexible material. In embodiments, the molded pulp case 100 is about 0.01 inch to about 0.15 inch thick.

Additionally, in an embodiment, the molded pulp case 100 can be modified by cutting 214 one or more apertures 124 for accessing features including but not limited to a camera, a charging port, a headphones port, a microphone, a speaker, a vibrate button, a sleep/wake button, a volume button in locations specific to a given mobile device. In another embodiment, the molded pulp case 100 may be further modified by the application of coating 216 to further protect the molded pulp case 100 and increase durability. The coating can be plastic, vinyl or any other material. Designs 126 may be added to the molded pulp case 100 by methods including but not limited to printing, embossing, laser cutting, stamping, painting, inking, or carving at step 218. The addition of the designs can be done after the general molding process thus allowing the molded pulp cases 100 to be customized in small batches without retooling the manufacturing line. Customizing in small batches without retooling the manufacturing line keeps costs low, which is advantageous. In an embodiment, a batch or set of molded pulp cases 100 can be embossed with a company logo to be used as giveaways at a company retreat, or printed with information related to a particular event or achievement for presentation at the celebration or event. This customization can be accomplished during the post molding process without affecting the formation molds.

In embodiments, the case 100 can be formed with rounded corners 108 to conform to the curves of the mobile device. The malleability of the shaped pulp prior to drying allows the shaped pulp to be molded to conform to the particular shape of the mobile device. The molding process allows for curves in the shape of the exterior surface of the case 100, an effect that is difficult to achieve by simply folding semi-rigid material. For example, the rounded corners 108 of the exterior surface are aesthetically pleasing. Such rounded corners 108 or other curves can facilitate inserting and removing phones from pockets, as well. In an embodiment, the generally rough surface of the exterior surface of the case 100, the elastic nature of the case 100, and ability of the case 100 to conform to the exact shape of the mobile device causes the case 100 to feel comfortable in the user's hand.

As seen in FIGS. 1A-1D, one or more apertures 124 can be cut or formed in the molded pulp case 100 to expose features of a mobile device seated with the case 100. For example, the case 100 can include apertures 124 for a camera, a charging port, a headphones port, a microphone, a speaker, a vibrate button, a sleep/wake button, a volume button, or a combination thereof.

Figure 3:
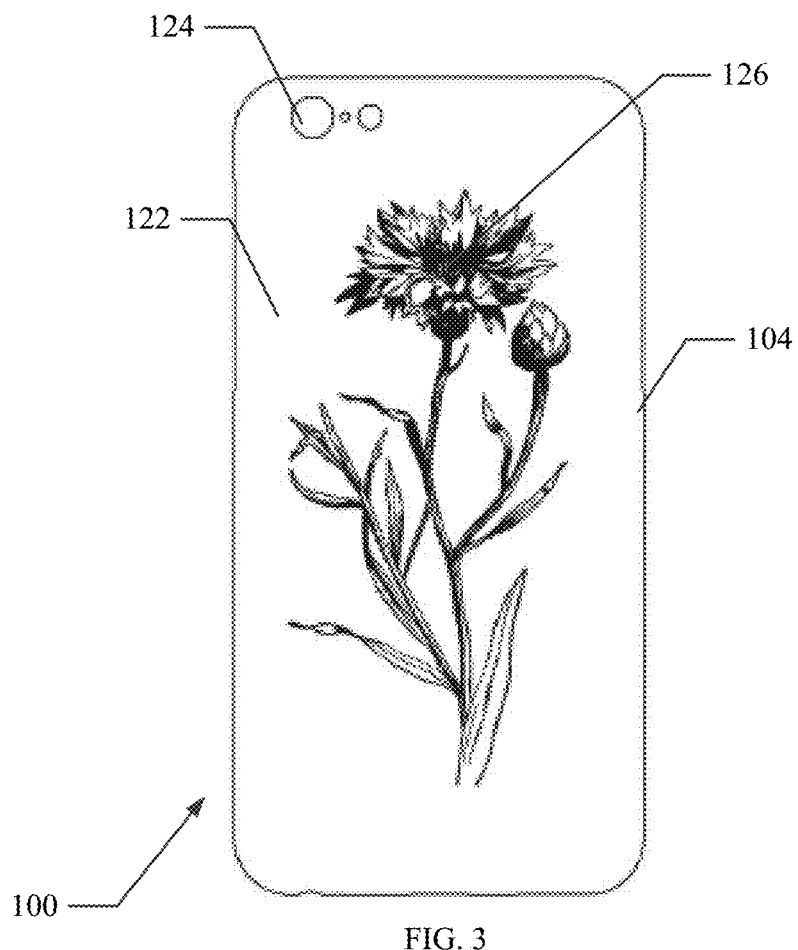
FIG. 3 depicts a rear view of an embodiment of the molded pulp case.

As seen in FIG. 3, the back panel 102 of the molded pulp case 100 is easily modified for decorative purposes. The manufacturer may choose to include a design on the back panel 102. Designs may be laser cut, punched, carved, embossed, stamped, painted, inked, or printed into/onto the back panel 102 in small or large batches after manufacture. The individual user may also choose to laser cut, punch, carve, emboss, stamp, paint, ink, or print a design themselves after purchasing the molded pulp case 100. The molded pulp case 100 lends itself to customization.

In embodiments, the raw material that can be used to make the pulp can come from fiber crops, waste paper, potato starch, or a combination thereof. Examples of fiber crops include, but are not limited to, bamboo, esparto grass, jute, flax, hemp, hoopvine, kenaf, linden bast, nettles, ramie, papyrus, aback sisal, bowstring hemp, henequen, phormium, yucca, coir, cotton, kapok, milkweed, luffa, umbrella plant, wheat straw, rice straw, reed, and bagasse.

In another embodiment, the raw material can be a type of recycled plastic. The recycled plastics can be pelletized first before adding into the pulper as part of the pulp molding process 200.

The raw materials that can be used to create the pulp can be very inexpensive, especially when compared to the traditional materials used to create cases for mobile devices, such as silicone or plastic. The inexpensive nature of the raw materials and the manufacturing process will allow the molded pulp case 100 to be made available to the public at a significantly lower cost than traditional mobile device cases. This reduced cost will allow users to change the cases 100 on their devices as often as they please. The low cost of the raw materials and manufacturing process will also permit the molded pulp case 100 to be distributed or given away as promotional items.

The raw materials can also be a green or environmentally friendly material. Many recycled materials (e.g., recycled paper or recycled plastics) can be used as the raw material for the preliminary pulp, and many of the raw materials that can be used to form the preliminary pulp will result in a case 100 that is recyclable and/or biodegradable after the user is finished with the molded pulp case 100. Production of the molded pulp case 100 can be more sustainable and result in less waste than traditional plastic or silicone cases.

In addition to the economic and environmental advantages, the molded pulp case 100 can appeal to users through a natural or green look. The molded pulp case 100 can be formed with minimal processing of the raw material, such as adding dyes, bleaching, or other treatments, to produce a product with a rustic, natural, or minimalist appearance. Decorations including the addition of natural materials including but not limited to seeds, grasses, leaves, or flower petals can be added to the preliminary pulp before or after filtering in step 204 of the method of manufacturing and before the preliminary pulp is drawn onto the formation molds in step 206. Green products are very popular in society, and users may appreciate the juxtaposition of the natural with their high tech mobile devices as they make a pro-green statement with the molded pulp case 100.

In embodiments, the pulp surface of the case 100 allows users to customize their cases 100. Users can draw or write on the exterior molded pulp case 100, particularly the back panel 104. The porous nature of certain types of the pulp material allows it to easily absorb ink and other drawing or writing media. In embodiments, a consumer may purchase blank molded pulp cases 100 and add artistic designs themselves by drawing on the cases with pen, marker or other like implements. In embodiments, the molded pulp case 100 can be pre-printed with designs that users can color in. For example, cases 100 can be printed with black and white line drawings in various patterns. Owners can use markers, paints, pencils or other implements to create their own artistic statement.

Users can collect signatures from celebrities or friends, as well as creating their own designs on the molded pulp cases 100. In embodiments, the pulp material can be bleached to provide a generally white background on which the user can draw or decorate. Designs can be easily printed, stamped or embossed on the molded pulp case 100 after molding. In embodiments, the pulp material is porous and is capable of taking up ink, paint, or other type of dye in a design. The pulp case 100 may also be embossed prior to sale or post sale to a customer. In embodiments, a company's logo could be easily printed, stamped or embossed on the molded pulp case 100, and the cost of production could be less than current promotional items. This type of customization can be performed without modification of the pulper and formation molds. The consumer may also use ink stamps, embossing stamps or tools, carving tools or other artistic implements to further customize the molded pulp case 100.

In embodiments, the case 100 further comprises a coating. In embodiments, a plastic coating is applied to the molded pulp case 100. In some embodiments, a wax coating is added to interior surface, exterior surface or both surfaces of the molded pulp case 100. Adding a coating can make the case 100 water-resistant, further protecting the mobile device and the case 100 itself from wear and liquids. A coating can prevent sweat or other liquids from permeating case 100, and reduces potential damage to the mobile device from liquids. Adding a coating can also make the case 100 abrasion-resistant. A coating can protect the case 100 from potential damage from friction or wear and tear. The coating can be sprayed or applied to the molded pulp case 100 after the case 100 has baked in the oven at step 212. In one embodiment, the case 100 can be dipped into a container of liquid wax to add a layer of wax coating to interior and exterior surfaces of the case. In embodiments, the coating is about 0.001 inch to 0.003 inch thick. In embodiments, a wax is a material that is solid at 20 degrees Celsius, melts at or above 40 degrees Celsius without decomposing, and has low viscosity at temperatures slightly above its melting point. In an embodiment, a coating can be a naturally occurring wax, a synthetic wax, or a combination thereof. Examples of naturally occurring waxes include, but are not limited to, beeswax, lanolin, lanocerin, shellac, ozokerite, carnauba, candellila, jojoba, ouricouri, montan, paraffin, and microcrystalline. Examples of synthetic waxes include, but are not limited to, polypropylene, polyethylene, polytetrafluoroethylene, fatty acid amide, and polyamide.

In some embodiments, the molded pulp case 100 further comprises an additive applied to or incorporated in the case. In one embodiment, the additive is incorporated into the preliminary pulp. The resulting case 100 incorporates the additive embedded throughout the body of the molded pulp case 100. In one embodiment, the additive is applied to the molded pulp. In this embodiment, the resulting case 100 has an additive applied to the surface, but not integrated throughout the body of the case 100. In other embodiments, the additive is incorporated into a coating applied to the molded pulp. In one embodiment, the additive is incorporated to the wax coating. In embodiments, the additive is an odorant, a colorant, glitter particles or a combination thereof. As used herein, an odorant is a scenting agent that causes the finished case 100 to have a particular scent or perfume. A colorant is an agent that colors all or part of a surface of the case 100. A glitter particle refers to a very small piece of shiny material wherein the shiny material can include, but is not limited to, metal particles, mylar, and coated paper. The molded pulp case 100 is easily colored, scented or infused with glitter particles. The permeable nature of the preliminary pulp from which the case 100 is made allows an odorant, colorant, or glitter particle to be easily incorporated into the case 100, making it an effective carrier of scent, color, and glitter particles. In embodiments, the preliminary pulp is also unlikely to react with an odorant or colorant because it is chemically inert.

In embodiments, an odorant can be added to the preliminary pulp prior to it being vacuumed onto the formation molds at step 206. In other embodiments, an odorant can be added to the molded pulp after the pulp is heated at step 212, such as by baking in the oven. The odorant can be a solid, a liquid, an oil, a wax, or a combination thereof. Examples of solid odorants include, but are not limited to, rose petals, lavender, orange peels, tea leaves, cinnamon, and other spices. In embodiments, liquid odorants, which are added to the pulp prior to it being vacuumed onto the formation molds, can be water-based so that they will disperse evenly throughout the pulp. Examples of liquid odorants include, but are not limited to, dimethyl anthranialte, ethyl-2-methyl butyrate, ethyl anthranilate, ethyl methyl dixolane (sold under the trademark Fragolan), heliotropine, menthyl-N-acetyl anthranilate (sold under the trademark Flora G), and methyl anthranilate. Oil odorants can be placed along with the mold pulp case 100 in a confined space after the case 100 has baked in the oven at step 212. The molecules of the oil odorant will absorb onto the case 100. Examples of oil odorants include commercially available perfume oils or essential oils. In embodiments that include a wax coating, an odorant can be dissolved in the wax before the wax is added to the molded pulp case 100.

In embodiments, a colorant can be added to the preliminary pulp prior to the preliminary pulp being vacuumed onto the formation molds. In other embodiments, a colorant can be added to the molded pulp after the molded pulp is heated at step 212, such as by baking in the oven. In embodiments that include a coating, a colorant can be dissolved in the coating before the coating is added to the molded pulp. The colorant can be a dye, a pigment, or a combination thereof. A dye dissolves in the pulp to form a solution. Pigments are solid, opaque particles suspended within the pulp. The dye can be an anionic liquid dye, a cationic liquid dye, a power dye, or combinations thereof.

Examples of anionic liquid dyes include, but are not limited to, $C_{16}H_{10}N_2Na_2O_7S_2$ (sold under the trademark Soterli Yellow 2G), $C_{37}H_{21}N_5O_4$ (sold under the trademark Soterli Yellow 3GN), $C_{26}H_{22}N_4Na_2O_9S_3$ (sold under the trademark Soterli Yellow 6GFN), $C_{34}H_{47}N_7O_{13}S_2$ (sold under the trademark Soterli Red 4B), $C_{21}H_{27}N_3O_5S$ (sold under the trademark Soterli Red EB), $C_{34}H_{21}N_6Na_3O_{11}S_2$ (sold under the trademark Soterli Orange 6R-Z), $C_{28}H_{20}N_4O_{12}S_4$ (sold under the trademark Soterli Orange RTG), $C_{32}H_{16}N_8Cu_2$ (sold under the trademark Soterli Blue 2BG), $C_{33}H_{22}N_5Na_3O_{11}S_3$ (sold under the trademark Soterli Blue GDF), $C_{32}H_{27}N_5Na_2O_8S_2$ (sold under the trademark Soterli Violet 3B), and $C_{34}H_{27}N_{13}Na_2O_7S_2$ (sold under the trademark Soterli Black G).

Examples of cationic liquid dyes include, but are not limited to, $C_{17}H_{22}C_{12}N_3$ (sold under the trademark Yoterli Yellow GXL), $C_{13}H_{14}N_4O_2$ (sold under the trademark Yoterli Yellow 5GF), $C_{28}H_{31}ClN_2O_3$ (sold under the trademark Yoterli Red BR), $C_{18}H_{23}BrN_6$ (sold under the trademark Yoterli Red GRL), and $C_{18}H_{20}Cl_2N_8$ (sold under the trademark Yoterli Brown T).

Examples of powder dyes include, but are not limited to, $C_{30}H_{26}N_4Na_2O_8S_2$ (sold under the trademark Yanterli Yellow G), $C_{16}H_{10}N_2Na_2O_7S_2$ (sold under the trademark Yanterli Yellow R), $C_{27}H_{18}N_6Na_2O_7$ (sold under the trademark Yanterli Yellow 5GL), $C_{33}H_{32}N_{10}Na_2O_{10}S_2$ (sold under the trademark Yanterli Yellow PG), $C_{35}H_{27}N_7Na_2O_{10}S_2$ (sold under the trademark Yanterli Red 4BS), $C_{33}H_{22}N_6Na_2O_9S_2$ (sold under the trademark Yanterli Orange S), $C_{32}H_{21}N_5Na_2O_8S_2$ (sold under the trademark Yanterli Pink 12B), $C_{32}H_{16}N_8Cu$ (sold under the trademark Yanterli Turquoise FBL), and $C_{32}H_{13}CuN_8Na_2O_6S_2$ (sold under the trademark Yanterli Turquoise GL).

Examples of pigments include, but are not limited to, $C_{20}H_{12}N_2O_2$ (sold under the trademark Materli Violet BN), $C_{32}H_{16}CuN_8O_6S_2$ (sold under the trademark Materli Blue R-L), $C_{17}H_{16}O_4N_4$ (sold under the trademark Materli Yellow HR), and $C_{24}H_{16}Cl_3N_3O_2$ (sold under the trademark Materli Red FGR).

In embodiments, a glitter particle can be added to the preliminary pulp prior to the preliminary pulp being vacuumed onto the formation molds 206. In embodiments, that include a coating, a glitter particle can be dissolved in the coating before the coating is added to the molded pulp case 100. In other embodiments, a glitter particle can be added to the molded pulp after baking in the oven at step 212 using an adhesive.

What has been described above includes examples of aspects of the claimed subject matter. It is, of course, not possible to describe every conceivable combination of components or methodologies for purposes of describing the claimed subject matter, but one of ordinary skill in the art can recognize that many further combinations and permutations of the disclosed subject matter are possible. Accordingly, the disclosed subject matter is intended to embrace all such alterations, modifications and variations that fall within the spirit and scope of the appended claims. Furthermore, to the extent that the terms "includes," "has" or "having" or variations in form thereof are used in either the detailed description or the claims, such terms are intended to be inclusive in a manner similar to the term "comprising" as "comprising" is interpreted when employed as a transitional word in a claim.

What is claimed is:

1. A removable case for a mobile device, comprising:
   a plurality of sides that cover at least portion of side walls of the mobile device, wherein when the mobile device is seated in the removable case, the plurality of sides overlap at least a portion of a front panel of the mobile device; and
   a back panel that substantially covers a rear panel of the mobile device when the mobile device is seated in the removable case;
   wherein the case is formed from a molded pulp conforming to the shape of the mobile device.

2. The case of claim 1, wherein the molded pulp is made from fiber crops, waste paper, potato starch, or a combination thereof.

3. The case of claim 1, further comprising an additive embedded throughout the case.

4. The case of claim 3, wherein the additive is a colorant.

5. The case of claim 3, wherein the additive is an odorant.

6. The case of claim 3, wherein the additive is a glitter particle.

7. The case of claim 1, further comprising an additive applied to a surface of the molded pulp.

8. The case of claim 1, wherein an exterior surface of the case is textured.

9. The case of claim 1, further comprising an embossed design.

10. The case of claim 1, further comprising a coating surrounding the molded pulp.

11. A process for producing a removable case for a mobile device, comprising:
    combining a raw material with water in a pulper;
    blending the raw material and water into a preliminary pulp in the pulper;
    drawing the preliminary pulp onto a formation mold substantially shaped as the mobile device to generate a shaped pulp; and
    drying the shaped pulp to produce the removable case.

12. The process of claim 11, wherein the removable case comprises:
    a plurality of sides that cover at least portion of side walls of the mobile device, wherein when the mobile device is seated in the removable case, the plurality of sides overlap at least a portion of a front panel of the mobile device; and
    a back panel that substantially covers a rear panel of the mobile device when the mobile device is seated in the removable case.

13. The process of claim 11, further comprising incorporating an additive into the preliminary pulp.

14. The process of claim 11, further comprising rinsing excess of the preliminary pulp off the formation mold.

15. The process of claim 11, further comprising incorporating an additive to the removable case.

16. The process of claim 15, wherein the additive is an odorant.

17. The process of claim 11, further comprising applying a coating to the removable case.

18. The process of claim 11, further comprising compressing the case to create an embossed pattern.

19. A removable case for a mobile device, comprising:
    a back panel substantially covering a rear panel of the mobile device, wherein the back panel is embossed; and
    a plurality of sides covering at least portion of side walls of the mobile device, the plurality of sides overlapping at least a portion of a front panel of the mobile device;
    wherein the case is formed from a molded pulp conforming to the shape of the mobile device, and the molded pulp incorporates an odorant.

20. The removable case of claim 1, the molded pulp is formed substantially from fiber crop material.

* * * * *